United States Patent
Keller et al.

(10) Patent No.: US 8,097,683 B2
(45) Date of Patent: Jan. 17, 2012

(54) POLYHEDRAL OLIGOMERIC SILSESQUIOXANE AND CARBORANE CONTAINING NETWORK POLYMERS

(75) Inventors: Teddy M Keller, Fairfax Station, VA (US); Manoj K. Kolel-Veetil, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/692,724

(22) Filed: Jan. 25, 2010

(65) Prior Publication Data

US 2010/0120989 A1    May 13, 2010

Related U.S. Application Data

(63) Continuation-in-part of application No. 11/834,741, filed on Aug. 7, 2007, now Pat. No. 7,655,738.

(60) Provisional application No. 60/948,721, filed on Jul. 10, 2007.

(51) Int. Cl.
*C08F 30/08* (2006.01)

(52) U.S. Cl. ......... 525/326.5; 528/5; 528/13; 528/32; 528/31; 528/40; 528/394

(58) Field of Classification Search ............ 525/326
See application file for complete search history.

(56) References Cited

U.S. PATENT DOCUMENTS

| | | | | |
|---|---|---|---|---|
| 5,939,576 A | * | 8/1999 | Lichtenhan et al. | 556/460 |
| 5,969,072 A | * | 10/1999 | Keller et al. | 528/5 |
| 5,981,678 A | * | 11/1999 | Keller et al. | 528/5 |
| 7,153,921 B2 | * | 12/2006 | Keller et al. | 528/5 |
| 2009/0018273 A1 | * | 1/2009 | Keller et al. | 525/337 |

* cited by examiner

*Primary Examiner* — Marc Zimmer
*Assistant Examiner* — Lindsay Nelson
(74) *Attorney, Agent, or Firm* — Amy L. Ressing; Joseph T. Grunkemeyer

(57) ABSTRACT

A thermoset and method of making such by crosslinking a mixture of a polyhedral oligomeric silsesquioxane having pendent siloxane groups or unsaturated carbon bonds and a siloxylcarborane compound having unsaturated carbon bonds.

14 Claims, 1 Drawing Sheet

US 8,097,683 B2

POLYHEDRAL OLIGOMERIC SILSESQUIOXANE AND CARBORANE CONTAINING NETWORK POLYMERS

This application is a continuation-in-part application of U.S. patent application Ser. No. 11/834,741, pending and filed on Aug. 7, 2007, which claims the benefit if U.S. Provisional Application No. 60/948,721 filed on Jul. 10, 2007. This application and all other referenced patent documents and publications throughout this application are incorporated herein by reference.

FIELD OF THE INVENTION

The invention is generally related to polymers containing polyhedral oligomeric silsesquioxane (POSS) groups and carborane groups.

DESCRIPTION OF RELATED ART

POSS systems have found use in hybrid inorganic/organic polymers. Ladder-like silsequioxane polymers have found applications in photoresist coatings for electronic and optical devices, interlayer dielectrics and protective coating films for semiconductor devices, liquid crystal display elements, magnetic recording media, optical fiber coatings, gas separation membranes, binders for ceramics and as carcinostatic drugs (Li et al., *J. Inorg. Organomet. Polym.* 2002, 11(3), 123-154). In the area of surface modification and corrosion prevention, POSS systems have been used as surface modifiers, dispersion agents, coupling agents, crosslinking agents, adhesion promoters, co-monomers, moisture scavengers and corrosion protection agents. In biomedical science, POSS has been used in place of fumed-silica which is typically used as a filler for improving the chemical, physical and biological properties of membranes used in immunoisolatory applications (Pittman et al., *J. Macromol. Symp.* 2003, 196, 301-325).

Carborane-containing polymers have found applications as conducting polymers (Masalles et al., *Adv. Mater.* 2002, 14, 826-837), cancer treatment agents in medicine (Thomas et al., *Chem. Comm.* 2001, 1884-1885), precursors for high performance fibers (Wei et al., *Chem. Mater.* 2006, 18, 1113-1122), supported organic catalysts (Yinghuai et al., *J. Organomet. Chem.* 2005, 690, 2802-2835), and in supramolecular assembly geared towards the production of nanomaterials (Wedge et al., *Coord. Chem. Rev.* 2003, 240, 111-162). In particular, polymers containing siloxane and carborane groups can exhibit exceptional thermal and thermo-oxidative properties (Dvornic et al., *High Temperature Siloxane Elastomers*, Huthig & Wepf, Heidelberg (1990)). Carborane groups improve the thermal and thermo-oxidative properties of siloxane polymers due to their chemical inertness arising from their low nucleophilicity, high hydrophobicity, and electron-withdrawing properties since they possess a highly polarizable σ-aromatic character (Williams, "*Carboranes*", (Chapter 2) in "*Progress in Boron Chemistry*", Vol. 2, Pergamon Press, New York (1970); Dunks et al., *Acc. Chem. Res.* 6 (1973) 124-142). Siloxane polymers containing carboranes, hence, can be used as high-temperature plastic, elastomeric, and ceramic materials especially in the aerospace and defense industries for applications in sealing assemblies of landing gears, flight control and fuel systems, and for cable insulations. The demand for such materials also exists for resist layers in the manufacture of computer chips.

Hydrosilation reactions of the carboranylenesiloxane monomer 2 with branched siloxane crosslinkers can produce high temperature elastomeric carboranylenesiloxane network polymers with exceptional thermal, thermo-oxidative and optical properties (Kolel-Veetil et al., *J. Polym. Sci. Part A: Polym. Chem.*, 2006, 44, 147-156). The reactions involved ambient condition hydrosilation reactions of the reactants in the presence of the heterogeneous hydrosilation catalyst known as the Karstedt catalyst (platinum-divinyl siloxane catalyst). The reactions were performed in hexane. These facile reactions can produce flexible and transparent network films of the anticipated product.

The base-catalyzed hydrolysis of Si—H to Si—OH and the ensuing condensation of Si—OH and Si—H groups to Si—O—Si bridges has been the subject of detailed investigations (Null, *Chemistry and Technology of Silicones*, Academic Press (1968)). Pt-based catalysts such as the Karstedt catalyst can promote such hydrolysis and condensation of Si—OH and Si—H groups in the presence of a base such as triethylamine ($Et_3N$) and water (Kurian et al., *J. Polym. Sci. Part A: Polym. Chem.*, 2002, 40, 1285-1292). The Karstedt catalyst was proposed to oxidize Si—H to Si—OH, whereas the $Et_3N$ co-catalyst was proposed to mediate the condensation of Si—OH to Si—O—Si (Lewis, *J. Am. Chem. Soc.*, 1990, 112, 5998-6004). Such reactions have been utilized in the formation of amphiphilic membranes that are crosslinked and reinforced by POSS (Isayeva et al., *J. Polym. Sci. Part A: Polym. Chem.*, 2004, 42, 4337-4352).

SUMMARY OF THE INVENTION

The invention comprises a thermoset made by crosslinking a mixture comprising: a polyhedral oligomeric silsesquioxane having pendent siloxane groups or unsaturated carbon bonds; and a siloxylcarborane compound having unsaturated carbon bonds.

The invention further comprises a method comprising crosslinking the above mixture.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
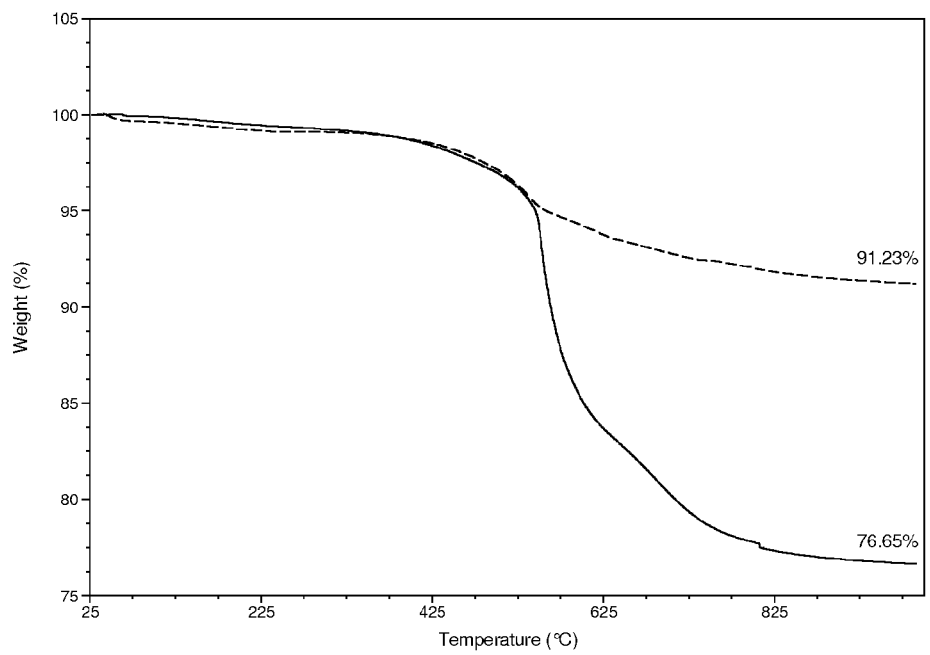
FIG. 1 shows char yields in air (dotted line) and in $N_2$ (solid line) of the POSS-carborane crosslinked network containing only hydrosilated —Si—$CH_2$—$CH_2$—Si— linkages.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Disclosed herein is a method for the production of inorganic-organic hybrid network polymers containing the clusters of POSSs and carboranes that may possess desirable thermal, thermo-oxidative, electrical, adhesive (coating/surface), and membrane properties. The method may utilize hydrosilation and hydrolysis/condensation reactions in unison involving the POSS and carboranylenesiloxane materials.

The properties of a carboranylenesiloxane such as 2 and that of a POSS monomer such as 1 may render them useful for incorporation into crosslinked networked system by the utilization of a combination of hydrosilation and hydrolysis/condensation reactions. In such compounds, there can be at least two types of crosslinking linkages such as the —Si—C(H)—C(H)—Si— linkages (formed from the hydrosilation reaction) and the —Si—O—Si— linkages (formed from the hydrolysis/condensation reactions). The vertices of the polyhedron in 2 are —BH groups, except for vertices labeled as C.

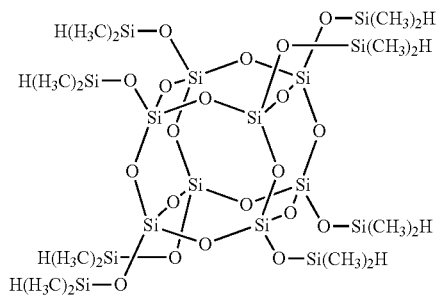

1

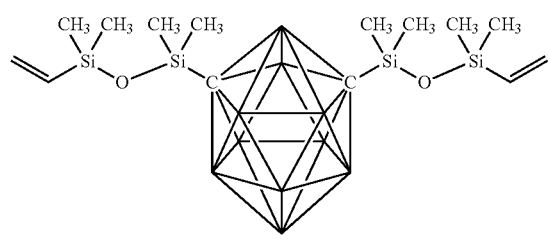

2

POSSs have the general formula $(RSiO_{1.5})_a(H_2O)_{0.5b}$ or rearranged to $R_aSi_aO_{(1.5a-0.5b)}(OH)_b$, where a is a positive integer, b is a non-negative integer, a+b is a positive even integer, and $b \leq a+2$. In a completely condensed POSS, b is zero and all Si—O—Si bridges are complete as in 1, which shows a=8 and b=0. In an incompletely condensed POSS, some adjacent pairs of silicon atoms are not bridged, each containing an OH group. Suitable POSSs include, but are not limited to, completely condensed POSS, incompletely condensed POSS, $(RSiO_{1.5})_8$, $((SiH(CH_3)_2O)SiO_{1.5})_8$ 1, $((CH_2=CH)SiO_{1.5})_8$ 3, and the incompletely condensed tris-norbornenylheptaisobutyl-POSS 4. In 4, R is isobutyl, a is 7, b is 3, the hydrogens in the general POSS formula are substituted, and the wavy bonds indicate a racemic mixture of cis- and trans-norbornenyl groups.

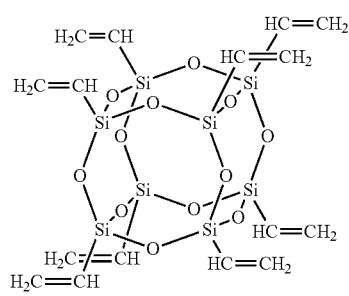

3

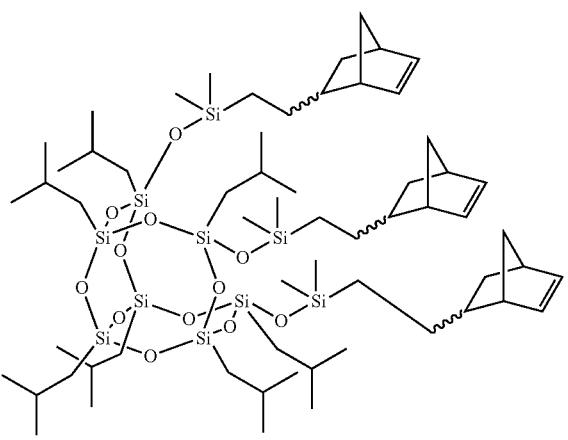

4

The carboranylenesiloxane compound contains at least one carboranyl group and at least one siloxane group. It may contain a siloxane oligomer, which may terminate in silicon atoms. The compound may be a small molecule or a polymer. Suitable carboranylenesiloxane compounds include, but are not limited to, 2 and the polymer 5. Also, any carboranyl group or carboranylenesiloxane compound disclosed in U.S. Pat. Nos. 6,967,233 and 5,969,072 may be used.

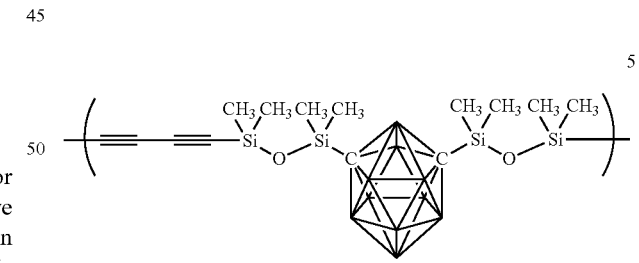

5

The mixture may also comprise curing agents that may crosslink with the POSS, the carboranylenesiloxane compound, or both. The curing agent may be a siloxane compound having unsaturated carbon bonds, including, but are not limited to, tetrakis(vinyldimethylsiloxy)silane 6, and a vinyldimethylsiloxy-bisphenol A-benzophenone adduct such as 7. The curing agent may also be a siloxane curing agent having silyl hydrogens, including, but are not limited to, tetrakis(dimethylsiloxyl)silane 8, methyltris(dimethylsiloxyl)silane 9, or phenyltris(dimethylsiloxyl)silane 10.

6

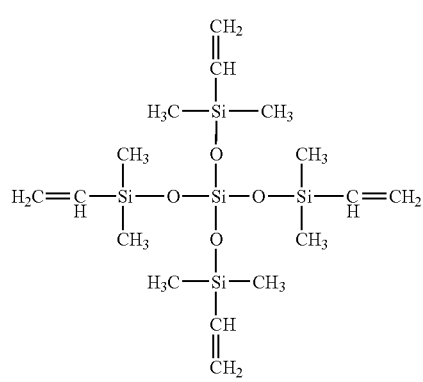

7

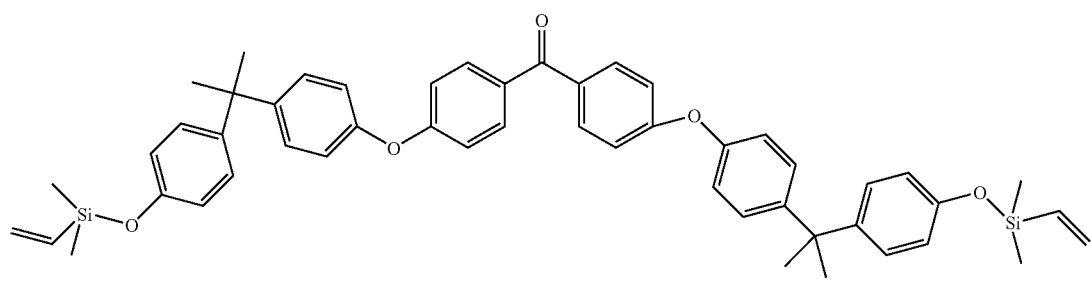

8

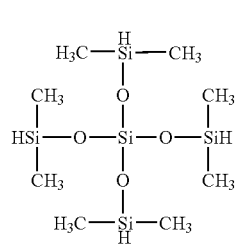

9

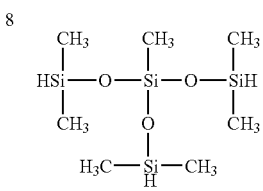

10

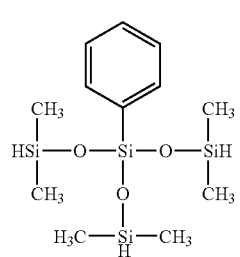

As used herein, crosslinking between two groups refers to direct reaction between the groups as well as to the use of a curing agent reacting with both groups. Also, there may be incomplete crosslinking with unreacted groups, or the crosslinking may be complete.

In one embodiment, the thermoset is crosslinked between the pedant siloxane groups of the POSS and the unsaturated carbon bonds of the siloxylcarborane compound. This may be done, for example, by a hydrosilation reaction between the Si-Vinyl groups of 2 and the Si—H groups of 1. The Karstedt catalyst $(Pt_2\{[(CH_2=CH)Me_2Si]_2O\}_3)$ may be used for this reaction. An example of this crosslinking is shown below, where the cubes represent the POSS cage of 1 and the rectangles represent the $—Si(CH_3)_2OSi(CH_3)_2(CB_{10}H_{10}C)Si(CH_3)_2OSi(CH_3)_2—$ of 2.

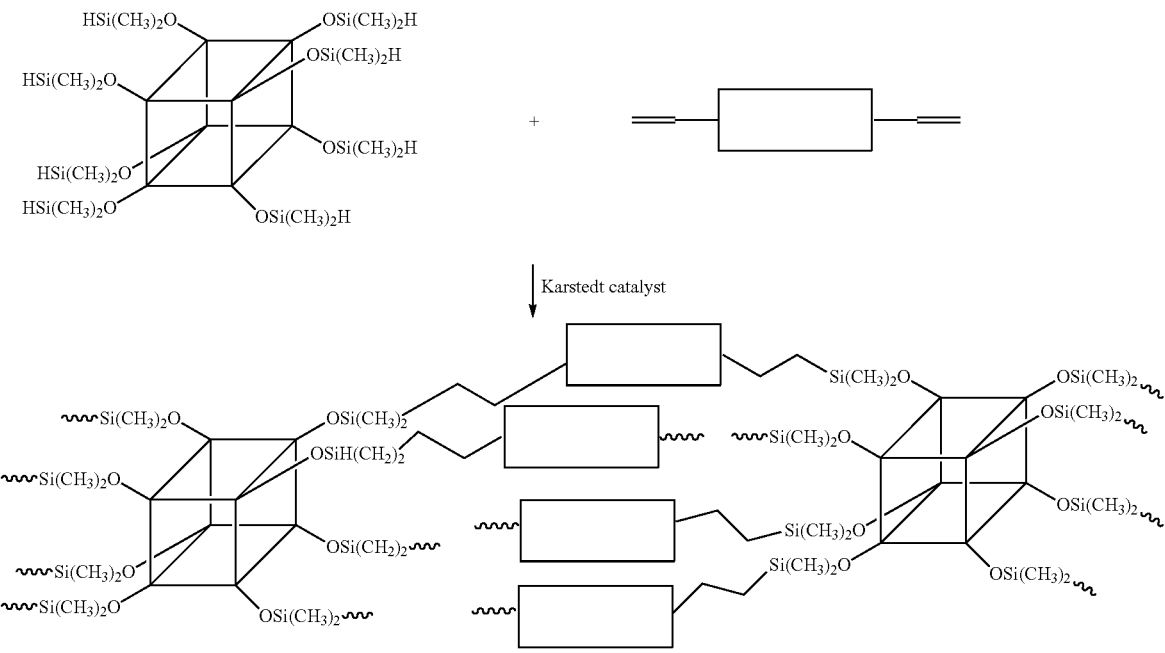

In another embodiment, thermoset is crosslinked between the pedant siloxane groups, in addition to the crosslinks between the pedant siloxane groups and the unsaturated carbon bonds. This may be done, for example, by a self hydrolysis/condensation reaction of 1 and 2 in the presence of the Karstedt catalyst, and catalytic amounts of triethylamine and water. An example of this is shown below.

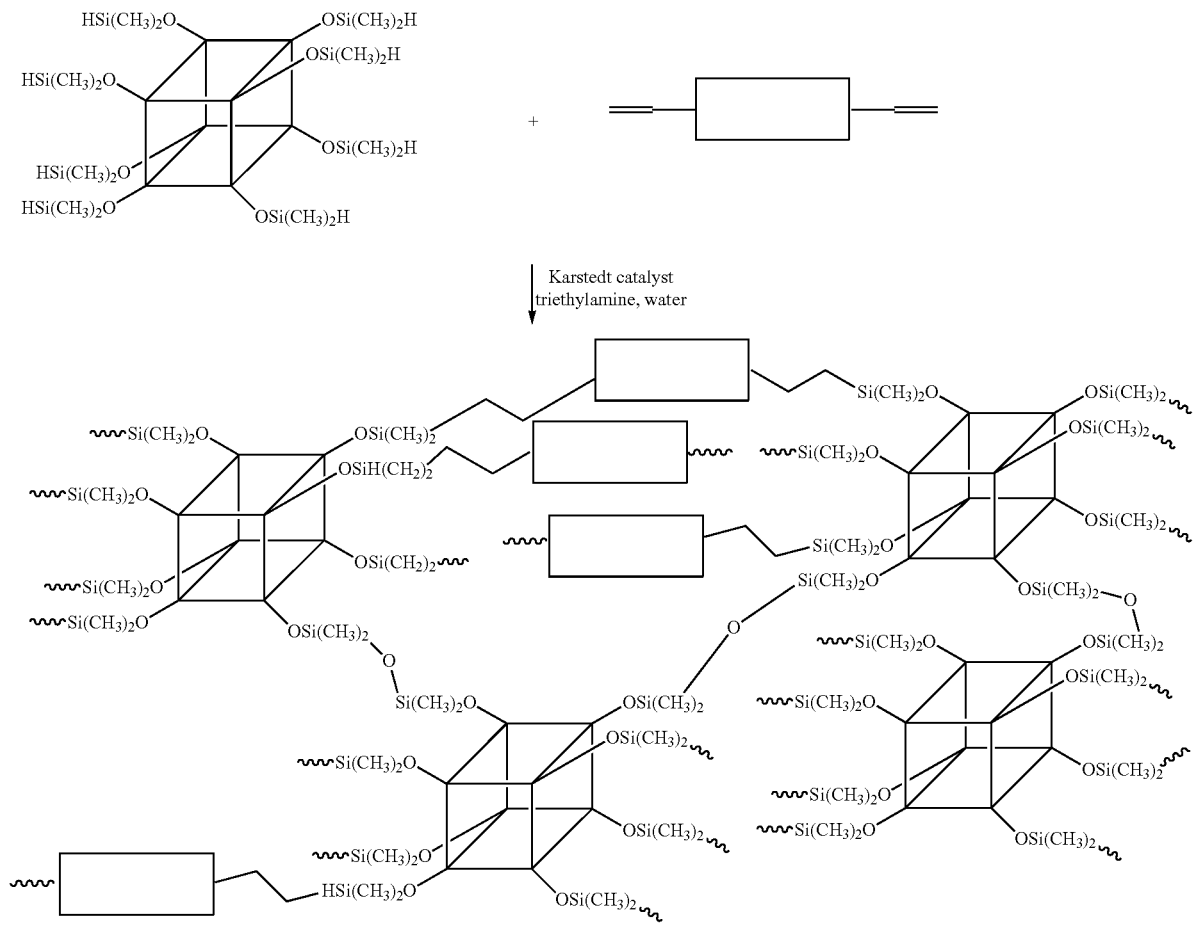

In another embodiment, the mixture further comprises a siloxane compound having unsaturated carbon bonds, such as 6 or 7. The crosslinking further occurs between the pendant siloxane groups of the POSS and the unsaturated carbon bonds of the siloxane compound. An example of this crosslinking is shown below, where the squares represent the [Si(CH$_3$)$_2$O]$_4$Si portion of 6.

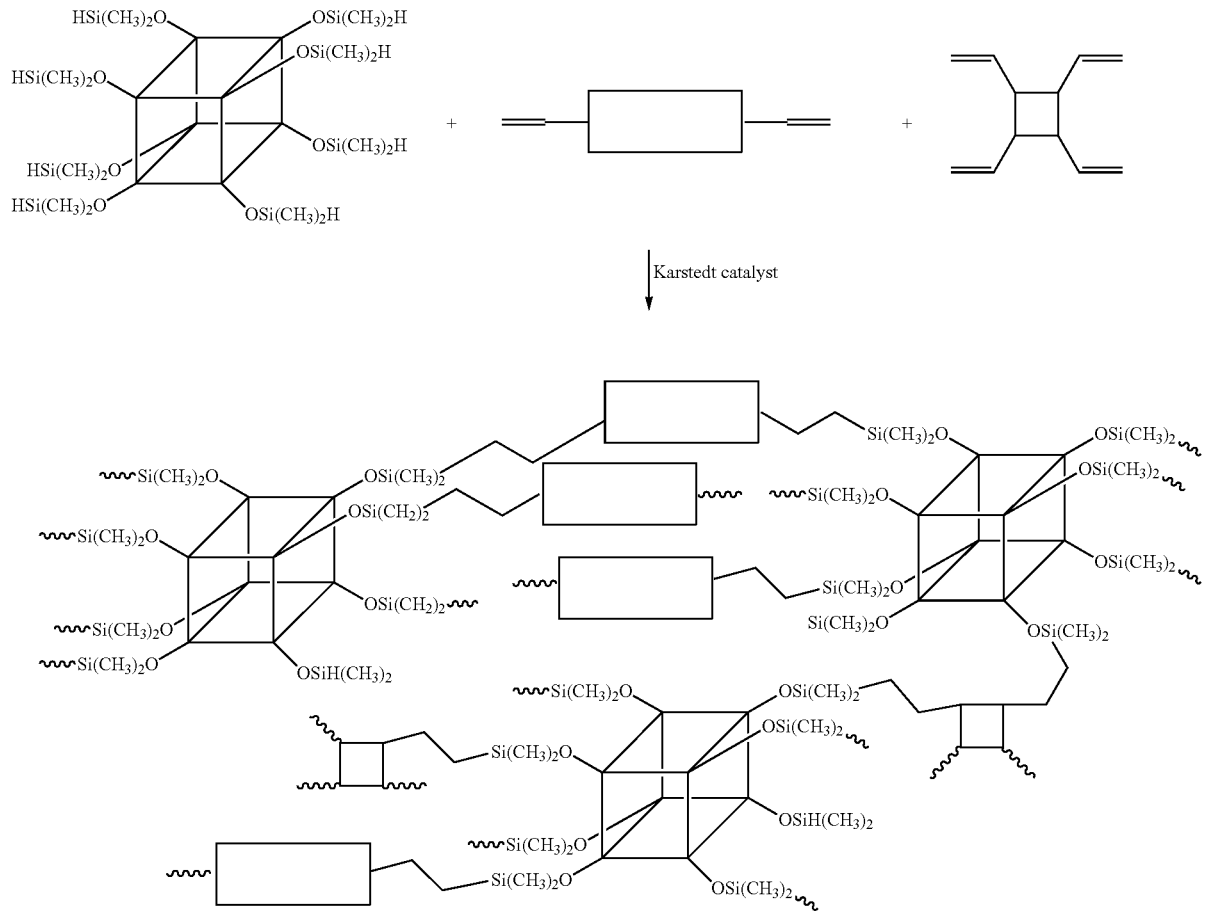

In another embodiment, the siloxylcarborane compound is a siloxylcarborane/diacetylene polymer. The thermoset is an interpenetrated networked polymer system of the crosslinked POSS and the crosslinked siloxylcarborane compound. This may be done, for example, in the presence of the Karstedt catalyst and catalytic amounts of triethylamine and water. An example of this crosslinking is shown below.

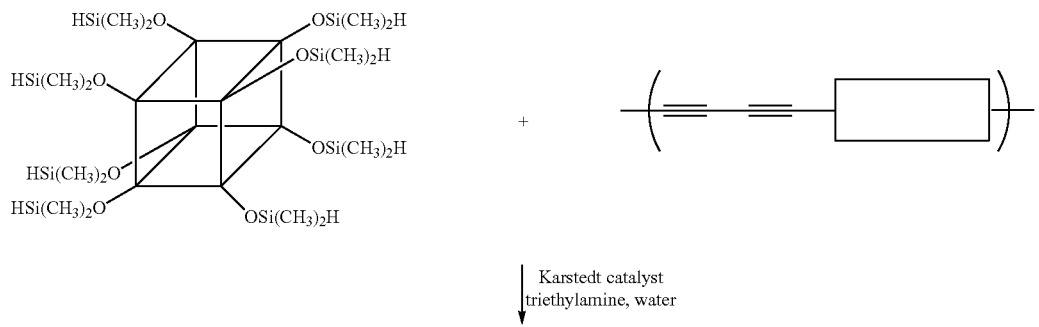

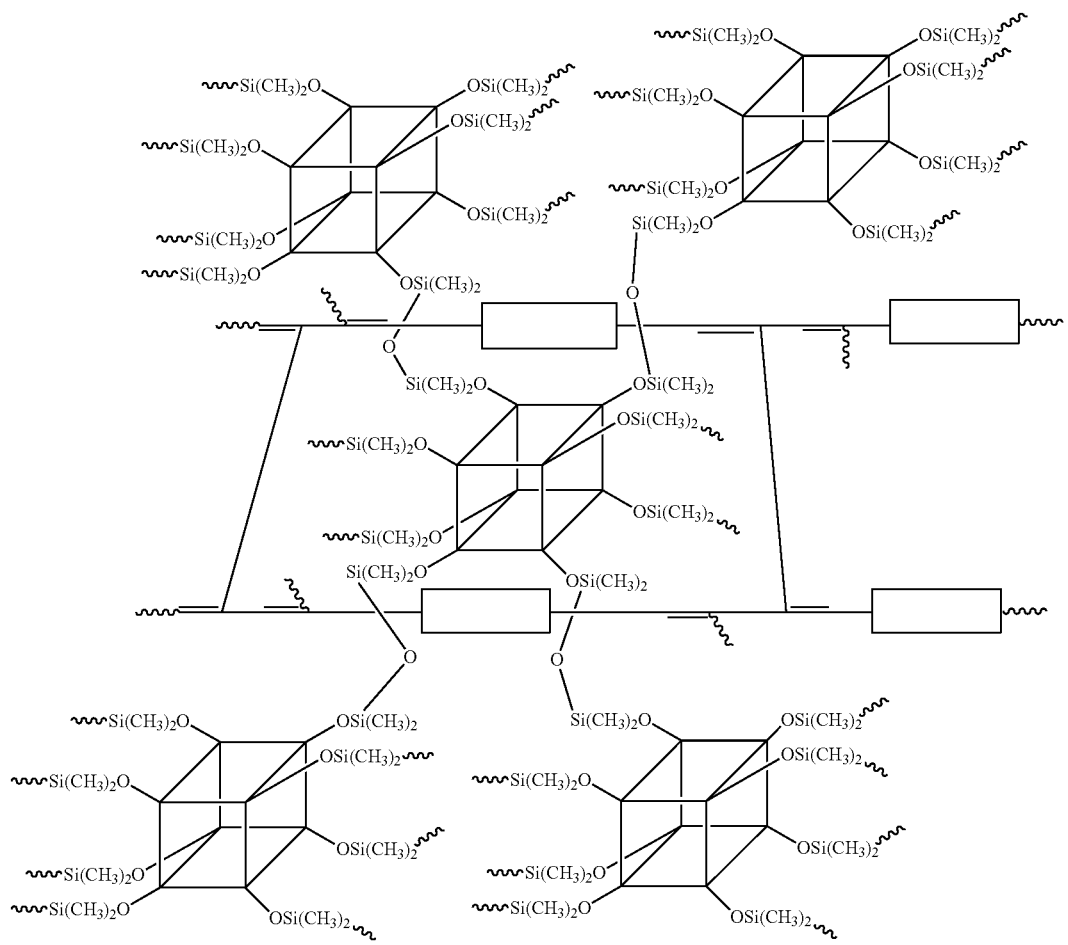
Under appropriate reaction conditions, the above reactants may crosslink by hydrosilation between the POSS and the polymer as shown below. Rh$_2$(1,5-cyclo-octadiene)$_2$(μ-Cl)$_2$ (Rh$_2$(COD)$_2$(μ-Cl)$_2$) or platinum diacetylacetonate (Pt(acac)$_2$) may be used as a catalyst.
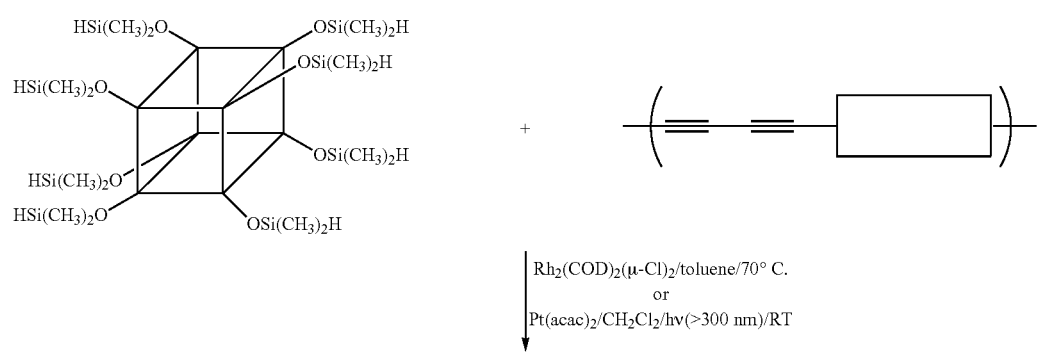

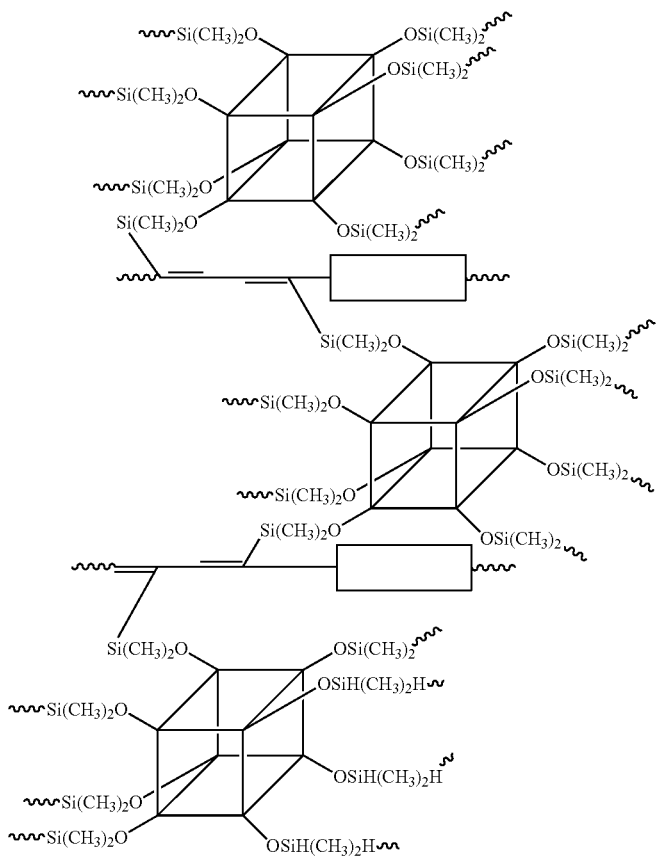

In another embodiment, the crosslinking occurs between the unsaturated carbon bonds of the POSS and unsaturated carbon bonds of the siloxylcarborane compound. For example, when the POSS is 4, this may be done by a ring opening metathesis polymerization in the presence of 3-methyl-2-butenylidne-bis(tricyclopropylphosphine)dichlororuthenium. Crosslinking between the unsaturated carbon bonds of the POSS, specifically between norbornenyl groups, may also occur.

In another embodiment, the crosslinking occurs between the unsaturated carbon bonds of the POSS and unsaturated carbon bonds of the siloxylcarborane compound using a siloxane curing agent having silyl hydrogens. This may be done by hydrosilation reactions between the curing agent and the POSS and siloxylcarborane compound. Suitable curing agents include, but are not limited to, 8, 9, and 10. An example of this is shown below. The circles represent the central portion of the curing agent.

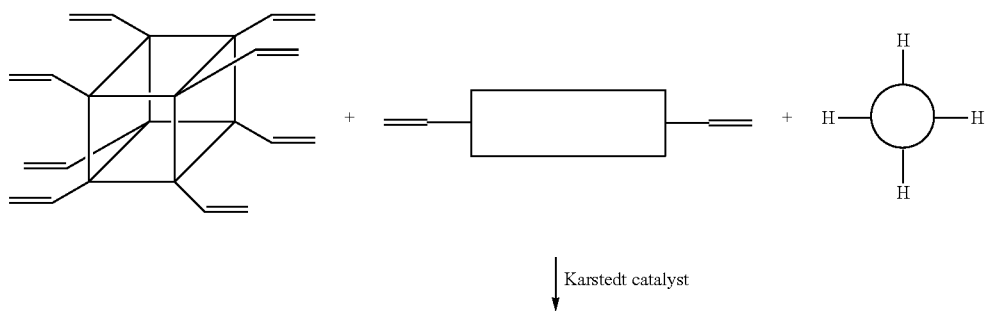

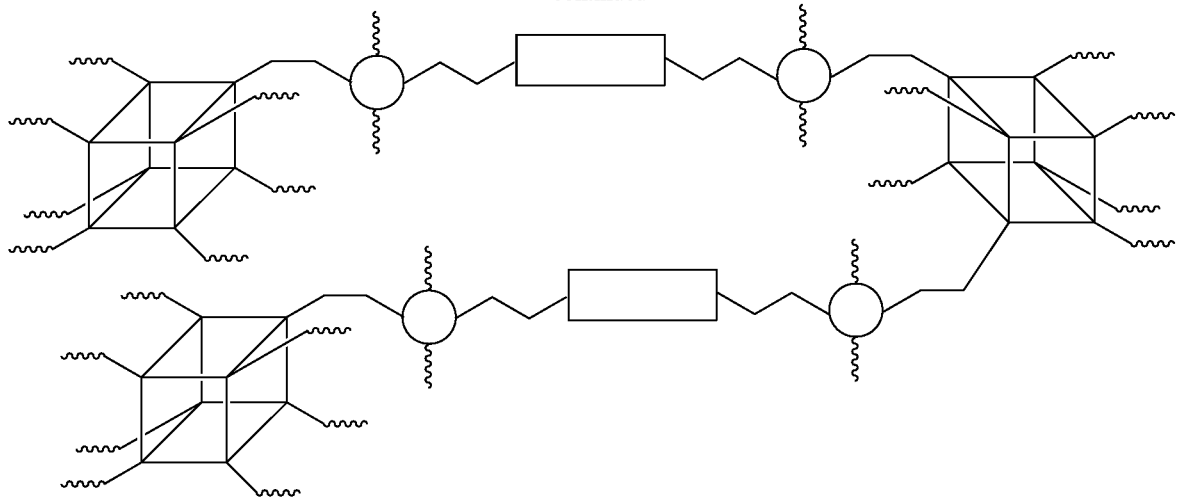
-continued

The inorganic-organic hybrid carborane-POSS network polymers incorporate two cluster species of carboranes and POSSs. These clusters, individually, are known for their exceptional chemical and material properties. The network polymers may have the cumulative properties of the two cluster systems. Thermo gravimetric analysis has shown high char yields in air and in $N_2$. In addition, the cooperation of the individual properties of the two cluster species could present hitherto unavailable properties such as, for example: (i) the thermo-oxidatively stability of a POSS-containing photoresist due to the cooperative enhancement in such a property by the carborane clusters, (ii) the gas permeation ability of a carborane-containing network polymer due to the presence of the POSS clusters, (iii) the neutron capturing ability of a POSS-containing carcinostatic treatment membrane due to the presence of the neutron-capturing boron atoms in the carborane clusters.

In addition, the presence of flexible siloxane units may render these network films more flexible which may not be singly achieved from either a carborane or POSS networked polymeric system. This may enhance the usability of the invented systems in applications with structural constraints.

POSS clusters are known to be exceptional space-survivable materials (Phillips et al., *Current Opinions in Solid State and Materials Science,* 2004, 8, 21-29). This is borne out of the following facts. Materials that are used in space applications are constantly exposed to atomic oxygen collisions. Typically, most of the composite materials used in space applications are made of organic polymers comprising mainly C—C, C—N and C—O bonds. The energy of scission of these bonds fall around 4 eV, while the energy of atomic oxygen collisions is about 5 eV. Naturally, the exposure of such organic polymer composites to atomic oxygen collisions will degrade the composites. In this regard, the energy of Si—O bond present in POSS clusters is 8 eV, much higher than that of the energy of atomic oxygen collisions. This would enable the space application materials made from POSS to survive the harsher environment present in the space by way of atomic oxygen collisions.

Recently, POSS clusters have also been established to be more biocompatible than silicones and have already found applications in cardiovascular and dental nanocomposites (Kannan, et al., *Acc. Chem. Res.* 2005, 38, 879).

In addition, carboranes are known to have exceptional cross-section for neutron capture (Carter et al., *Phys. Rev.* 1953, 92(3), 716). The $^{10}B$ nucleus present in carborane has been established to capture neutron, become excited and fragment into $^7Li$, $^4He$ (α particle) and γ-photon. Hence, carborane-containing materials should be usable in nuclear reactor facilities as shields for absorbing neutrons as neutrons are constantly liberated in such reactors (Stacey, *Nuclear Reactor Physics,* 2007, Wiley-VCH, pp 29-31).

The ability of carboranes to absorb neutrons also has enabled their utilization in a novel medical therapy for treatment of malignant tumors. This therapy known as the boron neutron capture therapy (BNCT) is currently gaining increased attention and there is an increasing amount of research efforts that is expended in producing cytotoxic species made from carborane-containing materials (Hawthorne, *Mol. Med. Today* 1998, 4, 174; Barth et al., *Clin. Canc. Res.* 2005, 11, 3987; Yinghuai et al., *J. Amer. Chem. Soc.* 2005, 127, 9875).

All of the above suggests the following anticipated applications for the POSS and carborane containing network polymers disclosed herein.

i) A single material with both space-survivable and neutron absorption components and thus, abilities.

ii) An advanced material that is highly biocompatible with the potential for use in BNCT therapy and other biomedical applications.

iii) A highly thermally- and thermo-oxidatively material that can be used as neutron shields in nuclear reactors.

Furthermore, the POSS and Carborane containing network polymers upon conversion to structural components/containers could be useful in the storage and transport of pyrophoric materials. For example, Li batteries could be stored and transported in containers fabricated from the POSS and Carborane containing network polymers due to the fire resistant properties of such polymeric and ceramic materials. In a fire environment, the containers would not burn thus protecting the batteries from burning and/or exploding. Li is very reactive on exposure to air or water.

Having described the invention, the following examples are given to illustrate specific applications of the invention. These specific examples are not intended to limit the scope of the invention described in this application.

Example 1

Crosslinked network containing only hydrosilated —Si—$CH_2$—$CH_2$—Si—linkages— In a typical reaction, 0.25 g of bis(vinyltetramethyldisiloxyl)m-carborane 2 (0.54 mmol; M.W.=460.36 g/mol) was taken in a reaction vial with 0.138 g of octasilane-POSS 1 (0.135 mmol; M.W.=1018 g/mol) and was mixed thoroughly using a mechanical stirrer. This yielded a Si—H:Si-vinyl ratio of 1:1 in the reaction mixture. To the mixture, 5 mL of either $CH_2Cl_2$ or toluene was added and the solution was thoroughly mixed using the stirrer to yield a clear solution. At this point, 2 drops of a 2-2.4 wt % Pt Karstedt catalyst solution in xylenes were added drop wise which was followed by 2 minutes each of thorough mixing. The solution became warmer and appeared yellow in color. The solution in the vial was then placed on a hot plate for 2 hours (The $CH_2Cl_2$ solution, at 40° C., and the toluene solution, at 70° C.). Upon heating, gelation occurred and the mixtures (which were tough) were transferred from the reaction vials to Teflon molds and were characterized by thermo gravimetric analysis in air and in $N_2$. Char yield of the product (formed from the $CH_2Cl_2$ reaction) at 1000° C. in $N_2$=76.65% and in air=91.23% (FIG. 1).

Example 2

Figure 2:
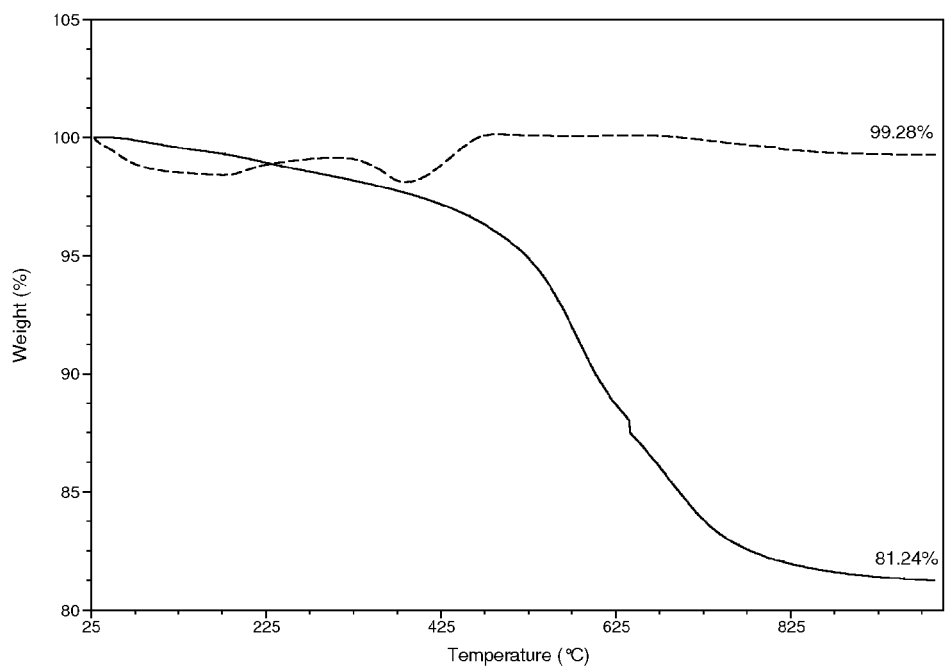
FIG. 2 shows char yields in air (dotted line) and in $N_2$ (solid line) of the POSS-carborane crosslinked network containing both the hydrosilated —Si—$CH_2$—$CH_2$—Si— linkages and the —Si—O—Si— linkages.

Crosslinked network containing both the hydrosilated —Si—$CH_2$—$CH_2$—Si— linkages and the —Si—O—Si— linkages—In a typical reaction, 0.25 g of bis(vinyltetramethyldisiloxyl)m-carborane 2 (0.54 mmol; M.W.=460.36 g/mol) was taken in a reaction vial with 0.276 g of octasilane-POSS 1 (0.135 mmol; M.W.=1018 g/mol) and was mixed thoroughly using a mechanical stirrer. This yielded a Si—H:Si-vinyl ratio of 2:1 in the reaction mixture. To the mixture, 5 mL of either $CH_2Cl_2$ or toluene was added and the solution was thoroughly mixed using the stirrer to yield a clear solution. At this point, 2 drops of a 2-2.4 wt % Pt Karstedt catalyst solution in xylenes were added drop wise that was followed by 2 minutes each of thorough mixing. The solution became warmer and appeared yellow in color. The solution in the vial was then placed on a hot plate for 2 hours (The $CH_2Cl_2$ solution, at 40° C., and the toluene solution, at 70° C.). Upon heating, the solution remained liquidy in consistency. To this solution, 50 μL each of $Et_3N$ and distilled water were added in succession when the mixture was seen to turn turbid (milky white in appearance). The mixtures were then transferred from the reaction vials to Teflon molds and were heated on a hotplate between 100-125° C. for 30 min during which complete gelation was observed to occur. The gelated films (which were tough) were characterized by thermo gravimetric analysis in air and in $N_2$. Char yield of the product (formed from the $CH_2Cl_2$ reaction) at 1000° C. in $N_2$=81.24% and in air=99.28% (FIG. 2).

Example 3

Crosslinked network from hydrosilation reaction of octavinyl POSS 3 and bis(vinyltetramethyldisiloxyl)m-carborane 2 with the crosslinking siloxane 8, 9, or 10—In a typical reaction, 0.182 g of bis(vinyltetramethyldisiloxyl)m-carborane 2 (0.395 mmol; M.W.=460.36 g/mol) was taken in a reaction vial with 0.250 g of octavinyl-POSS 3 (0.395 mmol; M.W.=633.05 g/mol) and was mixed thoroughly using a mechanical stirrer. To this mixture was taken 0.405 g or 0.458 mL of tetrakis(dimethylsiloxyl)silane 8 (0.989 mmol; M.W.=328.73 g/mol, d=0.886), 0.354 g or 0.410 mL of methyltris(dimethylsiloxyl)silane 9 (1.319 mmol; M.W.=268.61 g/mol, d=0.861), or 0.436 g or 0.462 mL of phenyltris(dimethylsiloxyl)silane 10 (1.319 mmol; M.W.=330.68 g/mol, d=0.942). This yielded a Si—H:Si-vinyl ratio of 1:1 in the reaction mixture. To the mixture, 5 mL of either $CH_2Cl_2$ or toluene was added and the solution was thoroughly mixed using the stirrer to yield a clear solution. At this point, 2 drops of a 2-2.4 wt % Pt Karstedt catalyst solution in xylenes were added drop wise which was followed by 2 minutes each of thorough mixing. The solution became warmer and appeared yellow in color. The solution in the vial was then placed on a hot plate for 2 hours (The $CH_2Cl_2$ solution, at 40° C., and the toluene solution, at 70° C.). Upon heating, gelation occurred and the mixtures (which were tough) were transferred from the reaction vials to Teflon molds and were characterized by thermo gravimetric analysis in air and in $N_2$. Char yield of the product (formed from the $CH_2Cl_2$ reaction) at 1000° C. in $N_2$=74.34% (8), 71.28% (9) or 73.55% (10) and in air=90.86% (8), 88.53% (9) or 90.01% (10).

Example 4

Crosslinked network from ring opening metathesis polymerization of trisnorbornenylisobutyl-POSS 4 and bis(vinyltetramethyldisiloxyl)m-carborane 2 catalyzed by 3-methyl-2-butylidene-bis(tricyclopropylphosphine)-dichlororuthenium—In a typical reaction, 0.250 g of bis (vinyltetramethyldisiloxyl)m-carborane 2 (0.543 mmol; M.W.=460.36 g/mol) was taken in a reaction vial under argon with 0.720 g of trisnorbornenylisobutyl-POSS 4 (0.543 mmol; M.W.=1326.45 g/mol) and was dissolved in 15 mL of THF. To this mixture was added 25 mg of the 3-methyl-2-butylidene-bis(tricyclopropylphosphine)dichlororuthenium catalyst. The mixture was heated at 80° C. for 10 hours and after which the product was recovered by removing the THF solvent under vacuum. Char yield of the product at 1000° C. in $N_2$=71.34% and in air=83.02%.

Example 5

Interpenetrating crosslinked network simultaneous thermal crosslinking of poly(carboranylenesiloxane) 5 and self hydrolysis/condensation reaction of octasilane-POSS 1 in presence of the Karstedt catalyst—In a typical reaction, 0.250 g of the poly(carboranylenesiloxane) 5 (0.550 mmol; M.W.=454.87 g/mol) and 0.560 g of octasilane-POSS 4 (0.550 mmol; M.W.=1018.00 g/mol) were taken together in a vial and were mixed thoroughly using a mechanical stirrer. To the mixture, 5 mL of either $CH_2Cl_2$ was added and the solution was thoroughly mixed using the stirrer to yield a clear solution. At this point, 2 drops of a 2-2.4 wt % Pt Karstedt catalyst solution in xylenes were added drop wise that was followed by 2 minutes each of thorough mixing. The solution in the vial was then placed on a hot plate for 2 hours at 40° C. To this solution, 50 μL each of $Et_3N$ and distilled water were added in succession. The mixtures were then transferred from the reaction vials to Teflon molds and were heated on a hotplate under argon between 100-125° C. for 30 min during which gelation was observed to occur. The films were further heated at 250° C. for two hours to initiate the thermal crosslinking of 5. The film was removed from the Teflon mold and was placed in an oven on a copper bar and was heated at 400° C. for 2 hours. The interpenetrated networked film was characterized by thermo gravimetric analysis in air and in $N_2$. Char yield of the product at 1000° C. in $N_2$=88.24% and in air=99.88%.

Example 6

Crosslinked network from hydrosilation reaction of bis(vinyltetramethyldisiloxyl)m-carborane 2 and tetrakis(vinyldimethylsiloxy)silane 6 with octasilane-POSS 1—In a typical reaction, 0.182 g of bis(vinyltetramethyldisiloxyl)m-carborane 2 (0.395 mmol; M.W.=460.36 g/mol) was taken in a reaction vial with 0.171 g of tetrakis(vinyldimethylsiloxy)silane 6 (0.395 mmol; M.W.=432.88 g/mol) and was mixed thoroughly using a mechanical stirrer. To this mixture was taken 0.301 g of octasilane-POSS 1 (0.296 mmol; M.W.=1018.00 g/mol). This yielded a Si—H:Si-vinyl ratio of 1:1 in the reaction mixture. To the mixture, 5 mL of either $CH_2Cl_2$ or toluene was added and the solution was thoroughly mixed using the stirrer to yield a clear solution. At this point, 2 drops of a 2-2.4 wt % Pt Karstedt catalyst solution in xylenes were added drop wise which was followed by 2 minutes each of thorough mixing. The solution became warmer and appeared yellow in color. The solution in the vial was then placed on a hot plate for 2 hours (The $CH_2Cl_2$ solution, at 40° C., and the toluene solution, at 70° C.). Upon heating, gelation occurred and the mixtures (which were tough) were transferred from the reaction vials to Teflon molds and were characterized by thermo gravimetric analysis in air and in $N_2$. Char yield of the product (formed from the $CH_2Cl_2$ reaction) at 1000° C. in $N_2$=79.39% and in air=88.52%.

Example 7

Crosslinked network from hydrosilation reaction of bis(vinyltetramethyldisiloxyl)m-carborane 2 and bisphenol A/benzophenone vinylsilane 7 with octasilane-POSS 1 catalyzed by platinum cyclovinylmethylsiloxane complex in cyclicmethylvinylsiloxanes 2.0-2.5 wt %—In a typical reaction, 0.600 g of bisphenol A/benzophenone vinylsilane 7 (0.747 mmol; M.W.=803.12 g/mol) was taken in a reaction vial with 0.060 g of bis(vinyltetramethyldisiloxyl)m-carborane 2 (0.130 mmol; M.W.=460.36 g/mol) (10% by weight of 7) and was mixed thoroughly using a mechanical stirrer. To this mixture was taken 0.230 g of octasilane-POSS 1 (0.219 mmol; M.W.=1018.00 g/mol). This yielded a Si—H:Si-vinyl ratio of 1:1 in the reaction mixture. To the mixture, 5 mL of either $CH_2Cl_2$ or toluene was added and the solution was thoroughly mixed using the stirrer to yield a clear solution. At this point, 2 drops of a 2-2.5 wt % platinum cyclovinylmethylsiloxane complex in cyclicmethylvinylsiloxanes were added drop wise which was followed by 2 minutes each of thorough mixing. The solution became warmer and appeared yellow in color. The solution in the vial was then placed on a hot plate for 2 hours (The $CH_2Cl_2$ solution, at 40° C., and the toluene solution, at 70° C.). Upon heating, gelation occurred and the mixtures (which were tough) were transferred from the reaction vials to Teflon molds and were characterized by thermo gravimetric analysis in air and in $N_2$. Char yield of the product (formed from the $CH_2Cl_2$ reaction) at 1000° C. in $N_2$=81.39% and in air=93.52%.

Example 8

Crosslinked network from hydrosilation reaction of octasilane-POSS 1 with poly(carboranylenesiloxane) 5 in presence of $Rh_2(COD)_2(\mu\text{-Cl})_2$ catalyst—A flame-dried 50 mL Schlenk flask was charged with 10 mg (0.0201 mmol) of $Rh_2(COD)_2(\mu\text{-Cl})_2$ under argon in a dry box. A 2 mL solution of 0.230 g of octasilane-POSS 1 (0.219 mmol; M.W.=1018.00 g/mol) in anhydrous toluene was prepared in another flame-dried flask. This solution was transferred via cannula into the flask containing the catalyst. A 5 mL solution of 0.100 g (0.219 mmol; M.W.=454.87 g/mol) of poly(carboranylenesiloxane) 5 in toluene, prepared in a third flame-dried flask, was syringed into the mixture to yield a mixture with a Si—H:—C=C— ratio of 2:1. The mixture was introduced into an oil bath at 70° C. The reaction was instantaneous as evidenced by the darkening of the color of the mixture. The mixture was stirred for 30 min at this temperature and then the volatiles were removed with vacuum. A cured gel resulted. Thermal properties: char yield at 1000° C. (in $N_2$): 82.52%, char yield at 1000° C. (in air): 95.23%.

Example 9

Crosslinked network from hydrosilation reaction of octasilane-POSS 1 with poly(carboranylenesiloxane) 5 in presence of the photochemical catalyst, $Pt(acac)_2$—A flame-dried quartz photochemical reaction tube was charged with 10 mg (0.0254 mmol) of $Pt(acac)_2$ under Ar in a dry box. 1 mL of $CH_2Cl_2$ was added to it to yield a pale yellow catalyst solution. In a separate vial, a 2 mL solution of 0.230 g of octasilane-POSS 1 (0.219 mmol; M.W.=1018.00 g/mol) was prepared in $CH_2Cl_2$. This solution was transferred into the reaction tube containing the catalyst. A 5 mL solution of 0.100 g (0.219 mmol; M.W.=454.87 g/mol) of poly(carboranylenesiloxane) 5, in $CH_2Cl_2$, prepared in another vial, was syringed into the mixture to yield a mixture with a Si—H:—C=C— ratio of 2:1. The reaction tube was inserted into a Rayonet Photochemical reaction instrument. The sample was irradiated for 30 min using a >300 nm (Pyrex filtered) radiation while being constantly agitated by a stream of argon which was passed via needle. After this period, the irradiation was stopped and the quartz tube was taken out of the reactor. The formation of a cured gel was observed. Thermal properties: char yield at 1000° C. (in $N_2$): 80.12%, char yield at 1000° C. (in air): 92.84%.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. A thermoset made by crosslinking a mixture comprising:
   a polyhedral oligomeric silsesquioxane having pendent unsaturated carbon bonds; and
   a siloxylcarborane compound having unsaturated carbon bonds;
   wherein the crosslinking occurs by direct reaction between the unsaturated carbon bonds of the polyhedral oligomeric silsesquioxane and unsaturated carbon bonds of the siloxylcarborane compound.

2. The thermoset of claim 1, wherein the siloxylcarborane compound is
   bis(vinyltetramethyldisiloxyl)m-carborane.

3. The thermoset of claim 1, wherein the polyhedral oligomeric silsesquioxane is:

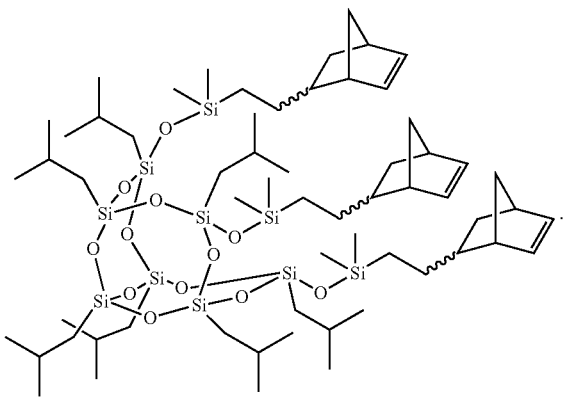

4. A thermoset made by crosslinking a mixture comprising:
a polyhedral oligomeric silsesquioxane having pendent unsaturated carbon bonds;
a siloxylcarborane compound having unsaturated carbon bonds; and
a siloxane curing agent having silyl hydrogens
wherein the crosslinking occurs between the curing agent and both the unsaturated carbon bonds of the polyhedral oligomeric silsesquioxane and unsaturated carbon bonds of the siloxylcarborane compound.

5. The thermoset of claim 4;
wherein the polyhedral oligomeric silsesquioxane is $((CH_2=CH)SiO_{1.5})_8$; and
wherein the siloxane curing agent is tetrakis(dimethylsiloxyl)silane, methyltris(dimethylsiloxyl)silane, or phenyltris(dimethylsiloxyl)silane.

6. A method comprising:
crosslinking a mixture comprising:
a polyhedral oligomeric silsesquioxane having pendent unsaturated carbon bonds; and
a siloxylcarborane compound having unsaturated carbon bonds;
wherein the crosslinking occurs by direct reaction between the unsaturated carbon bonds of the polyhedral oligomeric silsesquioxane and unsaturated carbon bonds of the siloxylcarborane compound.

7. The method of claim 6, wherein the siloxylcarborane compound is bis(vinyltetramethyldisiloxyl)m-carborane.

8. The method of claim 6, wherein the polyhedral oligomeric silsesquioxane is:

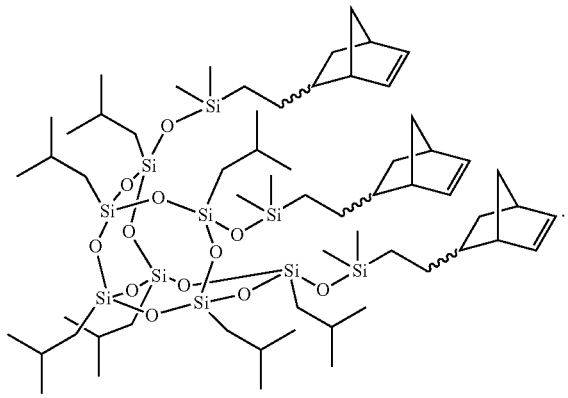

9. A method comprising:
crosslinking a mixture comprising:
a polyhedral oligomeric silsesquioxane having pendent unsaturated carbon bonds;
a siloxylcarborane compound having unsaturated carbon bonds; and
a siloxane curing agent having silyl hydrogens;
wherein the crosslinking occurs between the curing agent and both the unsaturated carbon bonds of the polyhedral oligomeric silsesquioxane and unsaturated carbon bonds of the siloxylcarborane compound.

10. The thermoset of claim 9;
wherein the polyhedral oligomeric silsesquioxane is $((CH_2=CH)SiO_{1.5})_8$; and
wherein the siloxane curing agent is tetrakis(dimethylsiloxyl)silane, methyltris(dimethylsiloxyl)silane, or phenyltris(dimethylsiloxyl) silane.

11. The thermoset of claim 3, wherein the crosslinking is by ring opening metathesis polymerization.

12. The thermoset of claim 11, wherein the crosslinking is in the presence of 3-methyl-2-butenylidne-bis(tricyclopropylphosphine)dichlororuthenium.

13. The method of claim 8, wherein the crosslinking is by ring opening metathesis polymerization.

14. The method of claim 13, wherein the crosslinking is in the presence of 3-methyl-2-butenylidne-bis(tricyclopropylphosphine)dichlororuthenium.

\* \* \* \* \*